(12) United States Patent
Mizota

(10) Patent No.: US 7,758,714 B2
(45) Date of Patent: Jul. 20, 2010

(54) TIRE STRUCTURAL MEMBER MANUFACTURING METHOD

(75) Inventor: Yasuo Mizota, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 479 days.

(21) Appl. No.: 10/555,188

(22) PCT Filed: Jul. 22, 2004

(86) PCT No.: PCT/JP2004/010389

§ 371 (c)(1),
(2), (4) Date: Jan. 24, 2006

(87) PCT Pub. No.: WO2005/009727

PCT Pub. Date: Feb. 3, 2005

(65) Prior Publication Data

US 2006/0124233 A1 Jun. 15, 2006

(30) Foreign Application Priority Data

Jul. 24, 2003 (JP) ............................... 2003-279422

(51) Int. Cl.
*B29D 30/38* (2006.01)
(52) U.S. Cl. ..................... 156/264; 156/406.4; 156/907
(58) Field of Classification Search .................. 156/906, 156/907, 264, 265, 134, 406.4, 117
See application file for complete search history.

(56) References Cited

U.S. PATENT DOCUMENTS

| 3,826,297 A * | 7/1974 | Alderfer ..................... 152/542 |
| 5,328,532 A | 7/1994 | Azuma et al. |
| 5,395,476 A | 3/1995 | Debroche et al. |
| 2003/0051794 A1 | 3/2003 | Suda et al. |

FOREIGN PATENT DOCUMENTS

| EP | 0 492 918 A2 | 7/1992 |
| EP | 1 145 835 A2 | 10/2001 |
| JP | 4-226742 A | 8/1992 |
| JP | 6-106652 A | 4/1994 |
| JP | 11-165360 A | 6/1999 |
| JP | WO 02/55289 A1 | 1/2002 |
| JP | 2002-307520 A | 10/2002 |
| JP | 2004-122727 A | 4/2004 |
| JP | 2004-167900 A | 6/2004 |
| WO | WO 03/101715 A1 | 12/2003 |

* cited by examiner

Primary Examiner—Geoffrey L Knable
(74) Attorney, Agent, or Firm—Sughrue Mion, PLLC

(57) ABSTRACT

A cord-reinforced band 2 having at least one cord 1 is cut into a plurality of cord-reinforced strips 3 of a predetermined length L. The cord-reinforced strips 3 are arranged successively such that side edge parts of adjacent cord-reinforced strips 3 overlap each other and the adjacent cord-reinforced strips are bonded together to form a tire structural member of a pre-determined length with respect to a direction perpendicular to the longitudinal side edges of the cord-reinforced strips 3. The tire structural member manufacturing method uses one and the same extrusion die 14 having an extrusion opening of a fixed width regardless of a pitch at which the cords 1 are arranged. Thus, the tire structural member manufacturing method is simpler.

6 Claims, 3 Drawing Sheets

TIRE STRUCTURAL MEMBER MANUFACTURING METHOD

TECHNICAL FIELD

The present invention relates to a tire structural member manufacturing method of manufacturing a tire structural member of a predetermined length by successively arranging cord-reinforced strips such that the edges of adjacent cord-reinforced strips overlap each other and bonding the overlapping edges of the cord-reinforced strips.

BACKGROUND ART

A prior art method of forming a cord-reinforced tire structural member, such as a belt or a carcass ply, disclosed in, for example, WO 02/055289 forms a tire structural member of a predetermined length by cutting a cord-reinforced band into a plurality of narrow, cord-reinforced strips of a predetermined length and successively connecting the cord-reinforced strips such that the side edge parts of adjacent cord-reinforced strips overlap each other.

The width of the cord-reinforced band is equal to $\pi D/n + \alpha$, where D is the diameter of a forming drum, n is an integer and $\alpha$ is the width of the side edge part of the cord-reinforced strip.

The pitch p of the cords of the cord-reinforced band is dependent on the required performance of the tire, such as durability, capability to ensure driving stability and capability to improve ride comfort as well as the strength and elastic modulus of the materials of the tire. The number of the reinforcing cords in the cord-reinforced band is equal to the integral part of $\{(\pi D/n) + \alpha\}/p$.

Practically, the number of the reinforcing cords and the pitch p of the reinforcing cords are parameters of the standard width of the cord-reinforced band. For example, the standard width of a cord-reinforced band in a first example reinforced with twenty-four cords arranged at a pitch p of 1.64 mm is 39.36 mm (=1.64×24 mm) as shown in FIG. 6.

The standard width of a cord-reinforced band in a second example reinforced with seventeen cords arranged at a pitch of 2.27 mm is 38.50 mm (=2.27×17 mm) as shown in FIG. 7.

DISCLOSURE OF THE INVENTION

Underlying Problem to be Solved by the Invention

Since cord-reinforced bands respectively having different cord pitches p have different widths, respectively, the width of a guide passage, for guiding the cord-reinforced band, defined by guide members needs to be adjusted when the cord-reinforced band is changed, which is a factor that increases the cost of automated facilities.

The present invention has been made in view of such an underlying problem and it is therefore an object of the present invention to provide a tire structural member manufacturing method that uses cord-reinforced bands having the same width regardless of the pitch of the reinforcing cords and does not need the adjustment of the width of a guide passage when the cord-reinforced band of a type is changed for a cord-reinforced band of another type.

Means for Solving the Underlying Problem

A tire structural member manufacturing method of manufacturing a tire structural member of a predetermined length according to the present invention includes the steps of: cutting a cord-reinforced band having at least one reinforcing cord into a plurality of cord-reinforced strips of a predetermined length; and successively arranging the cord-reinforced strips such that side edge parts of adjacent cord-reinforced strips overlap each other and bonding the adjacent cord-reinforced strips together; wherein the cord-reinforced band has a fixed width regardless of a pitch at which the reinforcing cords are arranged in the tire structural member.

In the tire structural member manufacturing method according to the present invention, the fixed width of the cord-reinforced band may be determined by adding an increment to a calculated width of the cord-reinforced band as a function of the pitch of the reinforcing cords of the tire structural member.

The tire structural member manufacturing method of the present invention uses cord-reinforced bands of the desired fixed width regardless of the pitch of the reinforcing cords. Therefore, the width of a guide passage, for guiding the cord-reinforced band, defined by guide members does not need to be adjusted when the cord-reinforced band is changed and automated facilities can be made at a low cost.

Effect of the Invention

The tire structural member manufacturing method of the present invention uses cord-reinforced bands of the desired fixed width regardless of the pitch of the reinforcing cords. Therefore, the width of a guide passage, for guiding the cord-reinforced band, defined by guide members does not need to be adjusted when the cord-reinforced band is changed and an automated facilities can be made at a low cost.

Since the width of the cord-reinforced band is determined properly, a tire structural member of a predetermined length can be formed by successively arranging the cord-reinforced strips obtained by cutting the cord-reinforced band such that the side edge parts of adjacent cord-reinforced strips overlap each other and bonding together the overlapping side edge parts of the adjacent cord-reinforced strips.

The cord-reinforced band can be formed in the desired fixed width by increasing the calculated width of the cord-reinforced band as a function of the pitch of the reinforcing cords, while the predetermined pitch of the cords determined on the basis of the required capabilities of the tire and the strength and modulus of elasticity of used textile materials is maintained.

The predetermined fixed width of the cord-reinforced band can be determined on the basis of the pitch of the cords calculated from the predetermined length of the tire structural member and the tire structural member can be always formed in a fixed width.

BEST MODE FOR CARRYING OUT THE INVENTION

A tire structural member manufacturing method in a preferred embodiment of the present invention will be described with reference to FIGS. 1 to 3. This tire structural member manufacturing method is applied to the manufacture of a ply, i.e., a tire structural member.

Figure 1:
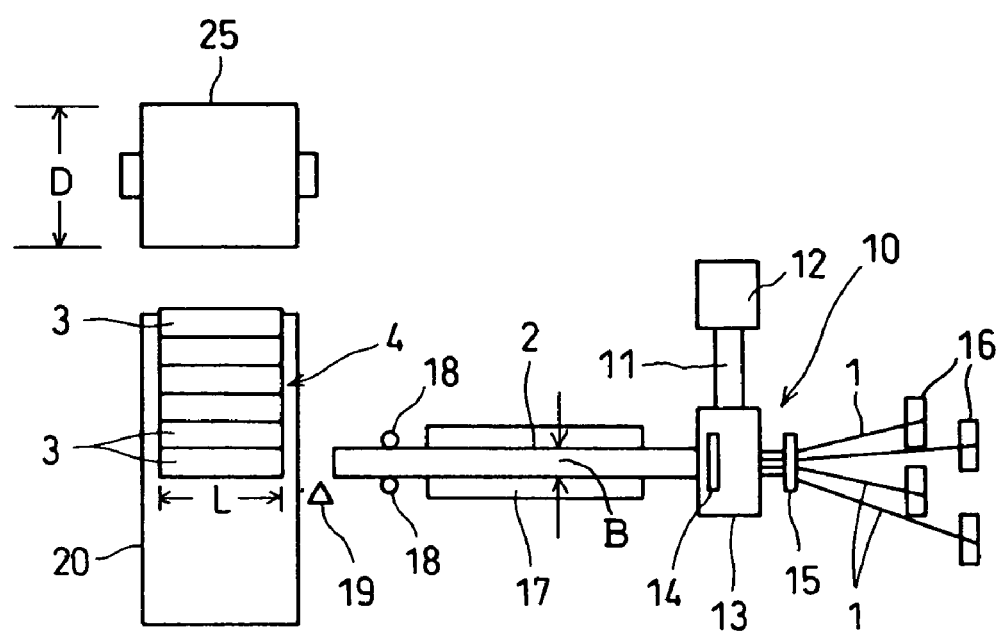
FIG. 1 is a diagrammatic view of a ply forming process in a first embodiment of the present invention.
Figure 2:
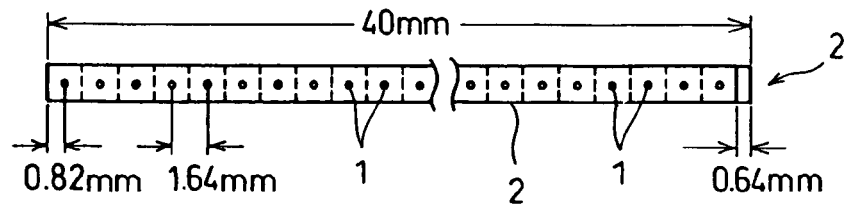
FIG. 2 is a sectional view of a cord-reinforced band of a fixed width in which reinforcing cords are arranged at a predetermined pitch.

Referring to FIG. 1 showing a ply forming process, an extruder 10 has a cylinder 11 internally provided with a screw. A material contained in a hopper 12 is supplied into the cylinder 11.

The material contained in the hopper 12 is a rubber compound for forming the ply. The rotating screw kneads the rubber compound supplied into the cylinder 11 and conveys the kneaded rubber compound to the front end of the cylinder 11. The rubber compound is forced into an insulation head 13 and is extruded through an extrusion die 14 of a predetermined shape.

An inserter 15 is disposed behind the extrusion die 14 of the insulation head 13 of the extruder 10. A plurality of reels 16 are disposed behind the inserter 15. The inserter 15 arranges a predetermined number of cords 1 fed from the reels 16 at a predetermined cord pitch in a horizontal plane. The cords 1 thus horizontally arranged by the inserter 15 are fed into the extrusion die 14. The cords 1 and the rubber compound are extruded through the extrusion die 14 in a predetermined shape to produce a cord-reinforced band 2 of a predetermined shape continuously. The extrusion die 14 forms the cord-reinforced band 2 in a width B.

A conveyor 17 conveys the continuously formed cord-reinforced band 2 to a transfer drum 20. Guide members 18 guide the longitudinal side edges of the cord-reinforced band 2 so that the cord-reinforced band 2 is positioned properly and can be fed onto a predetermined position on the circumference of the transfer drum 20. A cutter 19 is disposed ahead the transfer drum 20.

The transfer drum 20 having a large diameter is disposed with its axis extending parallel to a direction in which the cord-reinforced band 20 is conveyed such that cord-reinforced strips 3 of a predetermined length obtained by cutting the cord-reinforced band 2 by the cutter 19 are delivered onto the highest part of the circumference of the forming drum 20.

The guide members 18 position the cord-reinforced band 2 correctly relative to the transfer drum 20, the cutter 19 cuts a cord-reinforced strip 3 of a length L from the cord-reinforced band 2. The cord-reinforced strip 3 is attached to the transfer drum 20.

After the cord-reinforced strip 3 attached to the transfer drum 20 has moved circumferentially through a predetermined angle as the transfer drum 20 turns, the next cord-reinforced strip 3 is delivered onto the transfer drum 20 so that a front longitudinal side edge part thereof overlaps a back longitudinal side edge part of the preceding cord-reinforced strip 3. Thus cord-reinforced strips 3 are thus delivered successively onto the transfer drum.

A ply 4 of a predetermined length with respect to a direction perpendicular to the longitudinal side edge parts of the cord-reinforced strips 3 is formed by thus successively arranging and bonding together a predetermined number of cord-reinforced strips 3.

A forming drum 25 is disposed downstream of the transfer drum 20. The forming drum 25 has an inner liner as a base layer.

When the transfer drum 20 is moved close to the forming drum 25 so as to hold the ply 4 between the transfer drum 20 and the forming drum 25, and then the transfer drum 20 and the forming drum 25 are turned in opposite directions, the ply 4 is transferred from the transfer drum 20 to the forming drum 25.

The length of the ply 4 is substantially equal to the circumference of the forming drum 25. A leading edge part and a trailing edge part of the ply 4 are bonded together on the forming drum 25 to form an annular ply.

Suppose that the diameter D of the forming drum 25 is 15 in. (382 mm), and an integer n is 30 and the width α of the overlapping side edge part of the cord-reinforced strips 3 is very small. The circumferential length of the forming drum 25 is πD. Then, πD/n=382π/30≈40 (mm). Thus a desired width of the cord-reinforced band 2 is about 40 mm.

Thus, the desired fixed width of the cord-reinforced band 2 is determined as 40 mm. The extrusion die 14 having an extrusion opening of a width of 40 mm is always attached to the insulation head 13 regardless of the pitch of the cords 1.

Figure 6:
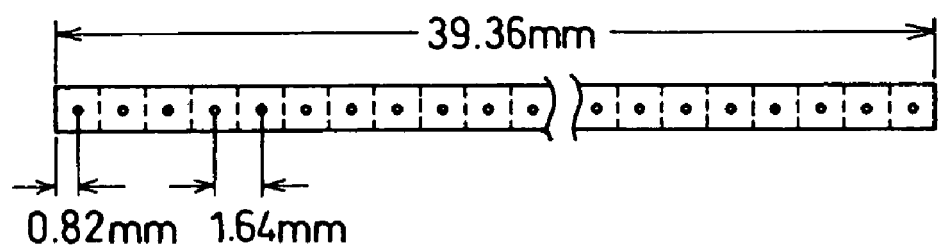
FIG. 6 is sectional view of a first conventional cord-reinforced band.

A first conventional cord-reinforced band shown in FIG. 6 has a width of 39.36 mm and is provided with twenty-four cords arranged at a pitch p of 1.64 mm. The tire structural member manufacturing method in this embodiment uses the extrusion die 14 having the extrusion opening of 40 mm in width and feeds twenty-four cords horizontally arranged at a pitch of 1.64 mm by the inserter 15 to form the cord-reinforced band 2 of the predetermined fixed width of 40 mm greater than a calculated width of 39.36 mm and provided with the cords 1 arranged at a predetermined pitch of 1.64 mm as shown in FIG. 2. The predetermined fixed width of 40 mm is determined by the width of the extrusion opening of the extrusion die of the extruder 10. Thus, an increment in the width of the cord-reinforced band 2 is 0.64 mm=40−1.64×24 mm. The increment in the width of the cord-reinforced band 2 may be allocated to one side part of the cord-reinforced band 2 or may be allocated equally to opposite side parts of the cord-reinforced band 2.

Figure 7:
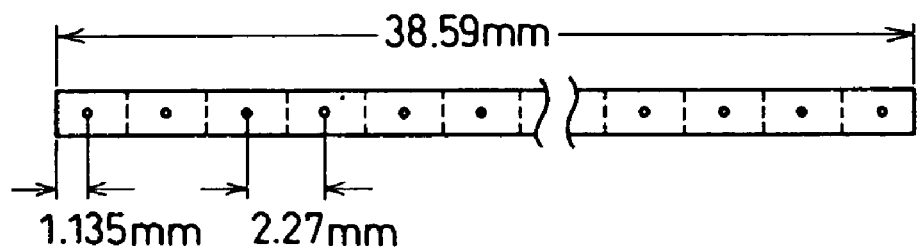
FIG. 7 is sectional view of a second conventional cord-reinforced band.

A second conventional cord-reinforced band shown in FIG. 7 has a calculated width of 38.59 mm and is provided with seventeen cords arranged at a pitch p of 2.27 mm. The tire structural member manufacturing method in this embodiment uses the extrusion die 14 having the extrusion opening of 40 mm in width and feeds seventeen cords horizontally arranged at a pitch of 2.27 mm by the inserter 15 to form a cord-reinforced band 2 of the predetermined fixed width of 40 mm greater than the calculated width of 38.59 mm and provided with the cords 1 arranged at a predetermined pitch of 2.27 mm as shown in FIG. 3. Thus, an increment in the width of the cord-reinforced band 2 is 1.41 mm=40−2.27×17 mm. The increment in the width of the cord-reinforced band 2 may be allocated to one side part of the cord-reinforced band 2 or may be allocated equally to opposite side parts of the cord-reinforced band 2.

The cord-reinforced bands 2 are thus formed in the desired fixed width of 40 mm regardless of the pitch of the cords. Therefore, one and the same extrusion die 14 can be used regardless of the type of the cords, and the positions of the guide members 18 do not need adjustment. Consequently, automated facilities can be manufactured at a low cost.

Figure 4:
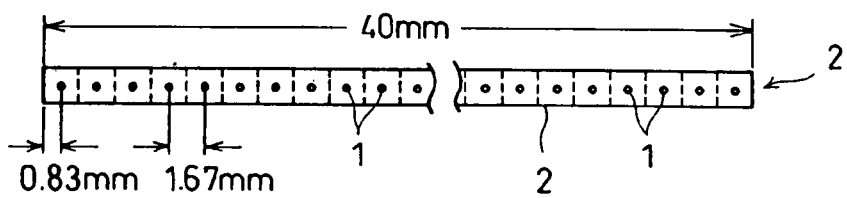
FIG. 4 is a sectional view of a cord-reinforced band of a fixed width in which reinforcing cords are arranged at a changed pitch.

In the foregoing description, the tire structural member manufacturing method in this embodiment uses the predetermined pitch p. A cord-reinforced band 2 of the desired fixed width of 40 mm provided with twenty-four cords arranged in uniform distribution over the entire width as shown in FIG. 4 similar to the cord-reinforced band 2 shown in FIG. 2 can be formed by using an inserter that arranges twenty-four cords at a pitch of 1.67 mm=40/24 mm and an extrusion die having an extrusion opening of 40 mm in width.

Figure 3:
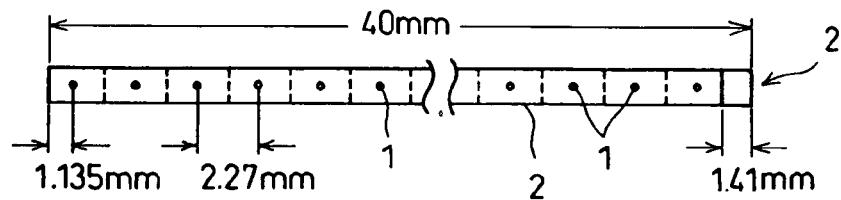
FIG. 3 is a sectional view of another cord-reinforced band of a fixed width in which reinforcing cords are arranged at a predetermined pitch.
Figure 5:
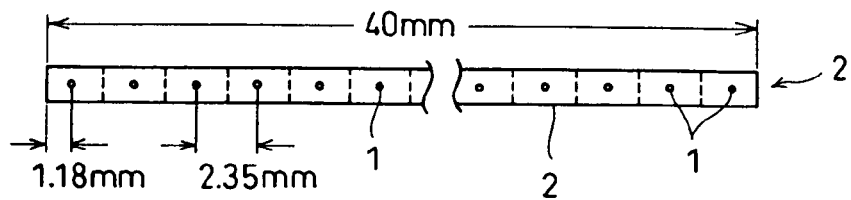
FIG. 5 is a sectional view of another cord-reinforced band of a fixed width in which reinforcing cords are arranged at a changed pitch.

A cord-reinforced band 2 of the desired fixed width of 40 mm provided with seventeen cords arranged in uniform distribution over the entire width as shown in FIG. 5 similar to the cord-reinforced band 2 shown in FIG. 3 can be formed by using an inserter that arranges seventeen cords at a pitch of 2.35 mm=40/17 mm and an extrusion die having an extrusion opening of 40 mm in width.

Thus, a cord-reinforced band 2 of the desired fixed width of 40 mm and provided with cords arranged in uniform distribution can be formed by arranging the cords at a pitch determined on the basis of the desired fixed width of 40 mm and the number of the cords. Therefore, the positions of the guide members do not need adjustment when the type of the cords is changed and hence automated facilities can be manufactured at a low cost.

Although the tire structural member manufacturing method has been described as applied to manufacturing a ply, it goes without saying that the tire structural member manufacturing method of the present invention is applicable to manufacturing other tire structural members, such as belts. The cords embedded in the layer of the rubber compound may be any of steel cords and resin cords.

The invention claimed is:

1. A method of manufacturing tire structural members, comprising:
   providing cord reinforced bands having therein reinforcing cords which are arranged at different cord pitches from one cord-reinforced band to another,
   wherein said providing cord reinforced bands comprises:
      calculating a calculated width for each cord-reinforced band as a function of the cord pitch of each cord-reinforced band,
      providing an increment of un-reinforced material on at least one end of the calculated width of each reinforced band to produce cord reinforced bands having different cord pitches and the same predetermined fixed width;
   cutting each of the cord-reinforced bands into a plurality of cord-reinforced strips of a predetermined length; and
   for each cord-reinforced band, successively arranging the cord-reinforced strips such that side edge parts of adjacent cord-reinforced strips of the same cord-reinforced band overlap each other and bonding the adjacent cord-reinforced strips together to obtain the tire structural members,
   wherein said cord-reinforced bands having different cord pitches are produced to have the same predetermined fixed width without regard to the cord pitches thereof, wherein the width of the increment is determined based on the difference between the fixed width and the calculated width of each cord reinforced band, and
   wherein said cord-reinforced bands having different cord pitches are produced to have different calculated widths based on the different cord pitches.

2. The method of manufacturing tire structural members according to claim 1, wherein the cord-reinforced bands are produced by extruding them through an extrusion opening of an extrusion die, and the fixed width of the cord-reinforced bands is determined by a width of said extrusion opening.

3. The method of manufacturing tire structural members according to claim 1, wherein the calculated width of each cord-reinforced band is proportional to said cord pitch.

4. A method of manufacturing tire structural members from cord-reinforced bands having therein reinforcing cords, comprising:
   providing at least a first cord-reinforced band with the reinforcing cords arranged at a first cord pitch,
   wherein said providing a first cord-reinforced band comprises:
      calculating a first calculated width for the first cord-reinforced band as a function of the first cord pitch of the first cord-reinforced band,
      providing a first increment of un-reinforced material on at least one end of the first calculated width of the first reinforced band to produce a first cord reinforced band having a predetermined fixed width;
   cutting the first cord-reinforced band into a plurality of first cord-reinforced strips of a predetermined length;
   successively arranging the first cord-reinforced strips such that side edge parts of adjacent first cord-reinforced strips overlap each other and bonding the adjacent first cord-reinforced strips together to obtain a first tire structural member;
   providing at least a second cord-reinforced band with the reinforcing cords arranged at a second cord pitch different from the first cord pitch,
   wherein said providing a second cord-reinforced band comprises:
      calculating a second calculated width for the second cord-reinforced band as a function of the second cord pitch of the second cord-reinforced band,
      providing a second increment of un-reinforced material on at least one end of the second calculated width of the second reinforced band to produce a second cord reinforced band having the same predetermined fixed width as the first cord-reinforced band;
   cutting the second cord-reinforced band into a plurality of second cord-reinforced strips of a predetermined length; and
   successively arranging the second cord-reinforced strips such that side edge parts of adjacent second cord-reinforced strips overlap each other and bonding the adjacent second cord-reinforced strips together to obtain a second tire structural member;
   wherein said first and second cord-reinforced bands having first and second cord pitches, respectively, are produced to have the same predetermined fixed width without regard to the different cord pitches thereof,
   wherein the width of the first and second increment in the first and second cord-reinforced band is determined based on the difference between the fixed width and the first and second calculated widths, respectively, and
   wherein the second calculated width of said second cord-reinforcing band is different width than the first calculated width of said first cord-reinforcing band.

5. The method of manufacturing tire structural members according to claim 4, wherein the first and second cord-reinforced bands are produced by extruding them through an extension opening of an extrusion die, and the fixed width of the first and second cord-reinforced bands is determined by a width of said extrusion opening.

6. The method of manufacturing tire structural members according to claim 4,
   wherein the first calculated width of said first cord-reinforcing band is proportional to the first cord pitch of the first cord-reinforced band, and
   wherein the second calculated width of said second cord-reinforcing band is proportional to the second cord pitch of the second cord-reinforced band.

* * * * *